United States Patent [19]

Parusel et al.

[11] Patent Number: 5,625,021
[45] Date of Patent: Apr. 29, 1997

[54] METHOD FOR THE PRODUCTION OF PLASTIC PARTICLES

[75] Inventors: Markus Parusel, Messel; Werner Siol, Darmstadt; Heinz Vetter, Rossdorf, all of Germany

[73] Assignee: Roehm GmbH Chemishe Fabrik, Darmstadt, Germany

[21] Appl. No.: 575,036

[22] Filed: Dec. 19, 1995

[30] Foreign Application Priority Data

Dec. 23, 1994 [DE] Germany ............... 44 46 365.0

[51] Int. Cl.⁶ .................................................. C08F 20/18
[52] U.S. Cl. .................. 526/329.7; 526/89; 526/319; 526/326; 526/328; 526/328.5; 526/329; 526/329.1; 526/329.2; 526/909; 526/911
[58] Field of Search ................... 526/329.7, 328.5, 526/329.1, 329.2, 909

[56] References Cited

U.S. PATENT DOCUMENTS

| | | | |
|---|---|---|---|
| 3,883,491 | 5/1975 | Hoke | 526/292.95 |
| 5,300,606 | 4/1994 | Aizawa | 526/307.6 |
| 5,322,632 | 6/1994 | Gambini | 252/51.005 |
| 5,451,650 | 9/1995 | Siol | 526/201 |

*Primary Examiner*—Fred Zitomer
*Attorney, Agent, or Firm*—Oblon, Spivak, McClelland, Maier & Neustadt, P.C.

[57] ABSTRACT

The invention relates to a method for the production of poly(meth) acrylate particles with a particle diameter of 1–15 μm, where the monomers M are polymerized according to the method of batch polymerization, with 20–50 parts by weight of monomer M in a liquid medium LM, consisting of 55–100% by weight of mineral oil, and with the addition of 0.1 to 5 parts by weight of a polymer emulsifier E and 0.05–5 parts by weight of a radical initiator.

25 Claims, No Drawings

METHOD FOR THE PRODUCTION OF PLASTIC PARTICLES

BACKGROUND OF THE INVENTION

1. Field of the Invention

The invention relates to a method for the production of defined plastic particles based on poly(meth)acrylate, particularly plastic particles which are stable in shape, in the particle size range 1–15 µm.

2. Discussion of the Background

In practice, there is an increasing demand for plastics in the form of plastic particles which are stable in shape, with a defined, uniform particle size. The particle size range of 1–50 µm and especially the narrower range of 1–15 µm are of particular interest. Particles of this type find applications in many different ways, for example as spacers in displays, films, etc., as surface modification agents, as carrier materials in diagnostics, etc. The main interest, however, is in the sector of the optical industry, which can achieve different light effects, particularly with particles in this size range, with an exactly adjustable refraction difference to a given light matrix.

The state of the art with regard to the production of polymethacrylate (PMMA) particles is very comprehensive. A great number of works relates to the production of polymethacrylate dispersions in organic media, for example according to Jpn. Kokai Tokyo Koho 8179,111 (=Chemical Abstracts: 95: 188086w), cross-linked particles of polyalkyl (meth)acrylates with $C_{6-20}$ alkyl groups or polyvinyl esters of $C_{7-21}$ fatty acids with a diameter of 5–8 µm are produced according to the pouring method, in Isopar G (aliph. petroleum oil). In addition, a large number of microfine, stable acrylate dispersions in organic media, for example for coating purposes, are described in, for example JP 62-220, 564=Chemical Abstracts 108: 133526w. JP 61-181,856= Chemical Abstracts 106: 34795k describes an extremely microfine dispersion which is stable for >6 months without sedimentation. A good overview of dispersion polymerization of methyl methacrylate in non-aqueous media is offered by the article by M. A. Winnik et al., in Makromol. Chem. Macromol. Symp. 10/11, 483–501 (1987).

Winnik et al. describe the influence of the solvent quality of the organosol medium on the polymerization speed of MMA or the influence of the solvent quality on the particle size, for example.

In general, hydrocarbons with a low boiling point, such as cyclohexane, heptane all the way to dodecane are described. As emulsifiers, many different types of block copolymer systems are used.

The requirements profile for polymer particles of the stated type, with a diameter of approximately 1–15 µm, has been known for a long time; however, there was no advantageous, technically-practicable production method. In German patent application P 43 27 464.1, the production of polymethyl methacrylate particles which are stable in shape is described in cyclohexane as the solvent/precipitant. In this method, very uniform particles with a diameter of 2–10 µm are obtained. According to knowledge available until now, a large number of boundary conditions had to be precisely adhered to.

The teaching of the stated patent application furthermore prescribes the use of percarbonates as initiators. There continues to be an interest in getting away from the various limitations of the stated methods. However, no reduction in product quality could be accepted.

The method of the present invention opens up this possibility in an excellent manner.

SUMMARY OF THE INVENTION

The present invention therefore relates to a method for the production of poly(meth)acrylate particles with a diameter of 1–15 µm, where the monomers M are polymerized according to the method of batch polymerization, with 20–50 parts by weight of monomer, in a liquid medium LM, consisting of 55–100% by weight of mineral oil, and with the addition of 0.1 to 5 parts by weight of a polymer emulsifier E and 0.05–5 parts by weight of a radical initiator. Preferably, polymerization is carried out at such a speed that the increase in the monomer conversion from 0 to >80%, especially preferably the increase in the monomer conversion from 1 to >90%, takes place during a time of 15–60 minutes.

DETAILED DESCRIPTION OF THE PREFERRED EMBODIMENTS

Monomers M which can be used according to the invention are selected from the group with the formula I

where R represents hydrogen or methyl and $R_1$ represents a $C_{1-8}$ alkyl group or a $C_{6-14}$ aryl group, preferably a group with $C_{6-10}$ carbon atoms, possibly substituted with $C_{1-8}$ alkyl, especially a phenyl, naphthyl or aralkyl group, preferably a benzyl group or phenethyl group, where in general at least 20% by weight, especially 30% by weight, and especially preferably 70% by weight and up to 100% by weight of the monomer M comprises methyl methacrylate; it is practical if the selection criteria indicated below are taken into consideration.

Preferably R in formula I stands for methyl, i.e. methacrylic acid esters are preferred.

As an aliphatic ester, isobutyl methacrylate can be mentioned, for example, as can methyl methacrylate, ethyl (meth)acrylate, butyl (meth)acrylate, 2-ethyl hexyl (meth) acrylate. Preferably, the monomers used are monomer mixtures, i.e. preferably the particles of the method, with a size of 1–15 µm, are comprised of copolymers.

Monomer mixtures which contain small portions, e.g. 0.5 to 10% by weight, of acrylic acid esters, in addition to the methacrylic acid esters as the main component, are preferred. As will be shown in the following, the achievable polymerization speed as well as the particle size can be adjusted by the composition of the monomer mixture.

The $C_{6-14}$ aryl or aralkyl (meth)acrylates serve to increase or equalize the index of refraction, among other things, where proportions of 1–80% by weight, preferably 1–50% by weight of the monomers M can be advantageous. For example, phenyl, tolyl, naphthyl, phenethyl and particularly benzyl (meth)acrylate should be mentioned. A proportion of vinyl aromatics such as styrene and its homologues in the monomers M is possible, but should be limited to amounts from 0 to <20% by weight, since these monomers disrupt the polymerization process.

The invention has shown that the use of hydrophilic monomers along with the other components makes it possible to control the particle size in the direction of decreasing the size of the particles. Such hydrophilic monomers are, for example, hydroxy (meth)acrylic acid or possibly $C_{1-12}$ alkyl substituted amino alkyl esters of (meth)acrylic acid as well as corresponding amides or, for example, (meth)acrylic acid.

Hydrophobic comonomers, such as the isobutyl methacrylates, phenyl methacrylates, benzyl methacrylates, butyl acrylates mentioned above, which can be present in amounts from 0 to approx. 70% by weight with reference to the monomers M, control the particle size in the direction of increasing the size of the particles.

Furthermore, the particles can be cross-linked by also using cross-linking agents, particularly graft cross-linking agents, i.e. monomers with two groups that can be radically polymerized, with different levels of reactivity, such as allyl (meth)acrylate, in proportions of 0.1 to 20 parts by weight with reference to the monomers M. The use of cross-linking monomers with similar units capable of polymerization, for example (meth)acrylic acid esters of multivalent alcohols, on the other hand, must be limited to <1 part by weight with reference to the monomers. In general, particles with a proportion of 0.1 to 20 by weight of cross-linking monomer are preferred, since these cross-linking agents guarantee the shape stability of the particles in the various applications. The surface properties of the particles can also be controlled via the amount of the cross-linking agent. For example, for some applications particles with a non-smooth, rough surface are especially preferred.

The polymer emulsifiers E which are to be used in amounts of 0.1–5 parts by weight according to the invention generally consist of block copolymers, preferably of styrene/olefin block copolymers BCP (cf. Houben-Weyl, Methoden der organischen Chemie Vol. E20/II, 987–993, G. Thieme-Verlag 1987). They are preferably selected from the group composed of a polystyrene and an ethylene copropylene block (=hydrogenated polyisoprene), or of a polystyrene and an ethylene cobutylene block (=hydrogenated polybutadiene) or directly of polystyrene/polyisoprene or polystyrene/butadiene block coplymers. The proportion of the styrene blocks to the other block copolymer part in BCP generally lies in the range of 20 to 80% by weight, preferably 30–50% by weight.

The block copolymers BCP generally possess a weight average molecular weight in the range $M_w$=24,000–200,000, preferably 50,000–130,000 (determination of molecular weights according to H. F. Mark et al., Encyclopedia of Polymer Science & Technology, Vol. 10, pg. 1–16, J. Wiley 1978). As examples, block copolymerizates of the type SHELLVIS® 50 from the Shell company, or K-resin types from Philips-Petroleum, for example K-Resin KRO5, should be mentioned. With regard to the selection of the polymerization initiator, no critical restrictions have been recognized until now, i.e. the initiators usually used for radical MMA polymerization, such as azo initiators or peroxide initiators, can be used in the conventional amounts, generally in the range of 0.05 to 3% by weight with reference to the monomers (cf. H. Rauch-Puntigam, Th. V ölker, Acryl- und Methacrylverbindungen, Springer-Verlag 1967). However, peroxy compounds such as peresters or percarbonates are preferred.

According to the definition, the liquid medium LM in which batch polymerization takes place comprises 55–100% by weight of mineral oil, preferably a gas oil with a boiling range of 225°–350° C. (cf. DIN 51567). The commercial products SHELL RISELLA OIL G07 can be named as examples. If the particles are to be used in applications in which they will be close to foods, mineral oils free of aromatics will be selected, for example EXXOL D 100S. As will be explained in greater detail below, the selection of the monomers might require an adjustment of the solution properties of the liquid medium LM, by adding further solvent components with good solution capacity for the polymers, as a function of the (solvent-dependent) polymerization speed of the monomers.

These include: alkyl benzenes such as toluene, solvents containing oxygen, such as carboxylic acid esters such as butyl acetate. The method according to the invention advantageously uses certain criteria which have been gained from experience and relate to the selection of the educts and parameters.

Implementation of the Invention

Adherence to the criterion for the polymerization speed, defined as 0 to >80%, preferably 1–80% conversion within 15–60 minutes, is of particular importance. Experience has shown that with a polymerization time of <12 minutes, only very fine particles are obtained, which are outside of the claimed range. With a polymerization time of >60 minutes, on the other hand, the particles are too large and non-uniform, or no particles are formed at all, and instead only solution polymerizates are formed. The poly(meth)acrylate particles obtained according to the invention generally lie entirely in the particle size range of 1–15 μm (with the diameter in the plane of greatest expanse serving as the measure of particle size). The determination is performed under the light microscope.

The process products demonstrate a rather uniform particle size distribution, in contrast to classical bead polymerizates. In connection with the present invention, they are therefore referred to as monodisperse. This is understood to mean that at least 80% by weight of the particles, preferably 90% by weight, lie within a size range of ±20% from the mean value indicated. Occasionally, smaller portions (<10% by weight) of fine particles can also be formed, but these are completely unimportant for applications technology.

The present invention particularly utilizes the knowledge that polymerizability, which is the most important criterion for production, can essentially be steered into the range according to the invention by means of two measures, namely the solvent quality and the chemical composition of the particles.

For example, pure methyl methacrylate (MMA) in a mineral oil (e.g. Shell. Risella gas oil) polymerizes within a few minutes, if not in seconds, to form particles ≦1 μm. By adding good solvents for the polymer, such as alkyl benzenes for example toluene, or preferably by adding solvents which contain oxygen, such as butyl acetate, the polymerization can be slowed down to such an extent that the increase in conversion from 1 to >80% lies within a period of 12–60 minutes, especially preferably in a period of 15–50 minutes for an increase in conversion from 1 to >90%. The additional possibility of placing the polymerization time to achieve the conversion of 1–80% into the range of 12–60 minutes consists of increasing the hydrophobicity of the particles, which is equivalent, in a first approximation, to increasing the C number and of branching or inclusion of aromatic groups in $R_1$, or any other monomers which might be present. The proportion of methacrylic acid esters other than MMA in the monomers M is usually 0–80% by weight. For example, in the transition from pure MMA polymerization to copolymerization with benzyl methacrylate (e.g. 40% by weight), the polymerization can be slowed down in the desired sense. The same effect is achieved by copolymerization with isobutyl methacrylate, for example.

According to the invention, the possibility therefore exists to produce practically any desired polymethacrylates with a diameter of 1–15 μm by copolymerization of methyl methacrylate with any other copolymerizable monomer in a medium such as the carboxylic acid ester/mineral oil mixture. By means of a practical selection of the comonomers, the core values of the polymers which are of interest, such as index of refraction, degree of cross-linking, etc. can be adjusted.

Polymerization can take place in a reactor suitable for precipitation polymerization, for example a 500 ml three-neck flask for small batches, equipped with a cooler, protective gas introduction device, thermometer and stirrer. It is practical if the work is carried out under a protective gas, such as argon. It is advantageous to place the mineral oil or the mixture with other solvents, the monomer(s), especially those of formula I, and the emulsifier into the reactor as a solution. As a point of departure, for example 150 parts by weight of liquid medium, with reference to the monomers, can be indicated. Subsequently, the mixture is heated to 50°–80° C., for example. Possible initiators are, as already explained, azo compounds and especially per compounds, e.g. peroxy esters, such as peroxy carbonates. As examples, bis-(4-tert. butyl cyclohexyl)-peroxy dicarbonate, along with dicyclohexyl peroxy dicarbonate (available under the trade name INTEROX BCHPC or INTEROX CHPC 1652 from the company Peroxidchemie), or tert. butyl perneodecanoate (cf. Brandrup-Immergut, Polymer Handbook, 3rd Ed. III-1, J. Wiley 1989) can be mentioned.

Usually, after the initiator is added, the temperature increases after only a short time, for example after one minute, and the solution, which has been clear until now, starts to become cloudy. After approximately 5 minutes, the batch is generally already white. As a typical precipitation polymerization, polymerization takes place rather rapidly, so that attention must be paid to good cooling and stirring. For a post-reaction, the mixture is still kept at an elevated temperature, for example approx. 80° C., for a certain period of time, for example approx. ½–2 hours, while stirring, and is then allowed to cool to room temperature while stirring.

The dispersions obtained in this way are completely free of coagulates. Isolation of the particles takes place using conventional liquid/solid separation methods, for example by means of filtration using a rotary plate filter or by centrifugation, for example with a decanter. For many applications, simple sedimentation of the particles is also sufficient. This separation of the particles by sedimentation and subsequent washing is particularly easy to carry out for particles with a diameter of 4–15 µm. For many applications, a residue of mineral oil can certainly remain in the particles. If necessary, the particles can also be washed with non-solvents, for example in order to remove residues of the emulsifier or other contaminants. Possible washing fluids are, for example, hydrocarbons such as cyclohexane or alcohols such as isopropanol. Monodisperse polymerizate particles in the size range indicated (diameter 1–15 µm) are obtained.

Aside from pure polymethacrylate particles and non-cross-linked copolymer particles, this method can preferably be used to produce cross-linked particles, with allyl methacrylate being preferred as a cross-linking agent, as explained above. For example, cross-linked, homogeneous particles consisting of 90 to 99.5% by weight methacrylic acid ester and 10–0.5 by weight allyl methacrylate, in a particle size range of 4.0–10.0 µm, are of interest.

Cross-linked particles comprising 0.5–10% by weight allyl methacrylate, 10–50% by weight phenyl alkyl methacrylate, possibly substituted, for example benzyl methacrylate, phenyl methacrylate and 40–89.5% by weight methyl methacrylate as well as 0–20% by weight other (meth)acrylic acid esters are also preferred.

Very special interest exists for cross-linked particles with the following composition:

30–80% by weight methyl methacrylate,

60–19.5% by weight benzyl methacrylate, and

10–0.5% by weight allyl methacrylate, with a particle size of 2–12 µm.

In general, the method according to the invention is very good at producing particles with an index of refraction $n_D$ in the range of 1.48–1.58, in the size range 1–15 µm, especially 2–7.5 µm.

Such particles can be worked very well into molding masses in proportions of 0.01–60% by weight, preferably in proportions of 0.5 to 25% by weight.

In this connection, all the molding masses which can be thermoplastically processed are possible, for example PVC, polyolefins, polyesters, polystyrene, polyamide, but especially amorphous, crystal clear, possibly also colored thermoplastic molding masses of the polymethacrylate type, polymethacrylate/styrene copolymers, polymethacrylate/styrene/maleic acid copolymers, polymethacryl imides, polycarbonates (here especially bisphenol-A polycarbonate), as well as polystyrene and PVC. Molding masses based on PMMA and polycarbonate are of particular interest. The molding masses can be used as such or also with impact resistance modifiers.

In addition to the use of the particles according to the invention in molding masses, the use of the particles in casting resins is also used. It is also preferred to work the particles into paints, especially into UV-cured reactive paints, in proportions of 0.01–30% by weight, for example.

When using the monodisperse particles in molding masses, either concentrates (master batches) can be used, or dry mixtures can be used directly. Molding masses or dry mixtures which contain these particles can be processed using known thermoplastic processing methods, for example, extrusion, injection molding, injection blowing, extrusion blowing, coextrusion.

The advantageous use of these monodisperse bead polymerizates serves for pure surface improvement of molded elements, for one thing, and in particular, optical effects can be achieved by working these particles into the molding mass or coextrusion mass.

The molding masses which contain these monodisperse particles are preferably used to produce projection walls, back projection walls, TV screens, slide projection walls (i.e. picture production in general), monitor covers, scale covers, lamp covers and also diffusion lenses.

In addition, room partitions can also be made from molding masses which contain these beads. The applications mentioned, only represent a small part of the possibilities for using molded masses with these monodisperse particles, which have a rough surface in the preferred case.

Having generally described this invention, a further understanding can be obtained by reference to certain specific examples which are provided herein for purposes of illustration only and are not intended to be limiting unless otherwise specified.

The following examples are intended to explain the invention. The particle size is determined under a light microscope.

EXAMPLES

Comparative Example 1

A 250 ml glass reactor, equipped with a stirrer, thermometer, cooler, gas introduction and made inert with nitrogen, is heated to 70° C., then

| | |
|---|---|
| 142.7 g | Shell Risella gas oil G07 (mixture of paraffin, naphthene and aromatic hydrocarbons, boiling range: 237–276° C., density: 0.857 g/cm³, viscosity 3.0 mm²/s (DIN 51562), flash point: 106° C.) |
| 30.02 g | methyl methacrylate |
| 24.77 g | benzyl methacrylate |
| 1.55 g | allyl methacrylate, and |
| 1.16 g | Shellvis 50 (Shellvis SAP 150), styrene/isoprene copolymer (softening temperature: 110° C.), rel. particle density of the bales (20° C.): 0.83 g/cm³, bulk density: 593 kg/m³ | are filled in and heated to 70° C. while stirring. When the Shellvis 50 has dissolved, polymerization is started by adding 0.62 g bis(4-tert. butyl cyclohexyl)-peroxy dicarbonate (dissolved in 5.58 g methyl methacrylate).

With this addition of initiator/monomer, the interior temperature drops by about 1° C. After about one minute, the reactor contents, which were clear initially, have turned white. The temperature increases to 76° C. within 5 minutes. After 10 minutes, the interior temperature reaches its maximum at 90.7° C. Polymerization is complete. After another minute, i.e. after a total of 11 minutes, the interior temperature drops to 88.6° C. and has returned to 70° C. after a total of 20 minutes.

A coagulate-free dispersion with a particle size <1 μm is obtained.

Example 2

The starting batch according to Example 1 is repeated, but instead of choosing pure mineral oil as the reaction medium, a mixture of

| | |
|---|---|
| 122.07 g | Shell Risella gas oil G07 and |
| 20.64 g | butyl acetate |
| | is selected. |

In this case, it is practical to present the following in the reactor:

| | |
|---|---|
| 122.07 g | Shell Risella gas oil G07 and |
| 15.06 g | butyl acetate |
| 35.60 g | methyl methacrylate |
| 1.55 g | allyl methacrylate, and |
| 1.16 g | Shellvis 50 | and heated to 70° C. while stirring, and polymerization is started by adding 0.62 g bis(4-tert. butyl cyclohexyl)peroxy dicarbonate dissolved in 5.58 g butyl acetate.

Due to the addition of initiator/solvent, the interior temperature drops by about 1° C., then increases slowly. After about 3 minutes, the reactor contents have turned white. After 19 minutes, the interior temperature reaches its maximum at 79.1° C. and then drops. Polymerization is complete. Stirring continues for another 20 minutes.

A coagulate-free dispersion is obtained.

>99% of all particles have a particle diameter of 2.5–2.7 μm.

Example 3

The method of procedure is the same as in Example 2, but the proportion of butyl acetate in the reaction medium is increased; the medium is then composed as follows:

| | |
|---|---|
| 111.75 g | Shell Risella gas oil G07 |
| 30.96 g | butyl acetate |

In this case, the reactor contents turn white after 4 minutes, the interior temperature reaches its maximum at 75.8° C. after 26 minutes:, stirring subsequently continues for another 24 minutes, with the temperature dropping to 70° C. Then the mixture is heated to 80° C. and kept at 80° C. for 30 minutes. No reaction heat at all can be ascertained.

After cooling to room temperature, a coagulate-free dispersion is obtained, >99% of all particles have a diameter of 3.5 μm.

Example 4

The method of procedure is the same as in Example 3, but a reaction medium is chosen in which the content of butyl acetate is increased once more:

| | |
|---|---|
| 101.43 g | Shell Risella gas oil G07 |
| 41.28 g | butyl acetate |

The temperature in the stirring reactor reaches its maximum at 73.5° C. after 39 minutes. Again, the mixture is allowed to cool to 70° C. and then heated to 80° C. for 30 minutes. The dispersion obtained is coagulate-free. The particles have a diameter of 6.7–7.1 μm. The particles have a rough surface. Along with the particles with a diameter of 6.7–7.1 μm (>95 1 by weight), <5% by weight of finer particles have been formed.

For processing, the particles are filtered off (filter cloth Nybolt 1 μm), subsequently dispersed in isopropanol and filtered off again, and then dried in a vacuum at 30° C.

The results of Examples 1–4 will be summarized again in Table 1.

TABLE 1

| Example No. | Butyl acetate/ solvent (% by weight) | Reaction time (min.) | Max. temp. (°C.) | Particle diameter (μm) |
|---|---|---|---|---|
| 1 | — | 10 | 90.7 | ≦1 |
| 2 | 14.5 | 19 | 79.8 | 2.5–2.7 |
| 3 | 21.7 | 26 | 75.8 | 3.5 |
| 4 | 28.9 | 39 | 73.5 | 6.6–7.1* |

* = small proportion of fine particles

Example 5

Production of particles with K-Resin KRO5 as the emulsifier. The method of procedure is the one according to Example 2.

Presented in the reactor:

| | |
|---|---|
| 105.95 g | Shell Risella gas oil G07 |
| 24.64 g | butyl acetate |
| 34.06 g | methyl methacrylate |
| 24.77 g | benzyl methacrylate |
| 3.10 g | allyl methacrylate |
| 7.70 g | of a 10% solution of K-Resin KRO5 in butyl acetate |

Start of polymerization with 0.62 g bis(4-tert. butyl cyclohexyl)-peroxy dicarbonate dissolved in 5.58 g butyl acetate. Temperature maximum after 28 minutes: 74.5° C. After cooling to room temperature, a coagulate-free dispersion is obtained. >90% by weight of the particles have a diameter of 4 μm ±0.5 μm. A slight proportion of fines is present.

Example 6

Synthesis of soft, cross-linked particles in a mineral oil free of aromatics

| | |
|---|---|
| 143.10 g | Exxsol D100S |
| 14.23 g | methyl methacrylate |
| 40.25 g | butyl acrylate |
| 1.86 g | allyl methacrylate |
| 0.77 g | Shellvis 50 | are heated to 70° C. in the stirrer reactor, in accordance with Example 1. Subsequently, polymerization is started with 0.62 g bis(4-tert. butyl cyclohexyl)-peroxy dicarbonate dissolved in 5.58 g methyl methacrylate.

After 5 minutes, the reactor contents have turned white. After 20 minutes, the temperature maximum is reached. After a total reaction time of 70 minutes, the mixture is heated to 80° C. and kept at this temperature for 30 minutes.

A coagulate-free dispersion is obtained. The particles are very uniform: diameter 4 μm. The particles are round and smooth. There are no fines.

Obviously, numerous modifications and variations of the present invention are possible in light of the above teachings. It is therefore to be understood that within the scope of the appended claims, the invention may be practiced otherwise than as specifically described herein.

This application is based on German Patent Application P 44 46 365.0, filed in the German Patent Office on Dec. 23, 1994, the entire contents of which are hereby incorporated by reference.

Suitable plastic particle are described in German Patent Application P 44 46 370.7, filed in the German Patent Office on Dec. 23, 1994, the entire contents of which are hereby incorporated by reference.

What is claimed as new and desired to be secured by Letters Patent of the United States is:

1. A method for the production of poly(meth)acrylate particles with a particle diameter of 1–15 μm, comprising batch polymerizing 20–50 parts by weight of monomer in a liquid medium comprising 55–100% by weight of mineral oil, in the presence of 0.1 to 5 parts by weight of a polymer emulsifier and 0.05–5 parts by weight of a radical initiator.

2. The method of claim 1, wherein an increase in a monomer conversion of from 0 to >80% takes place during a time of 15–60 minutes.

3. The method of claim 1, wherein said monomer is comprised of different comonomers.

4. The method of claim 1, wherein said monomer comprises at least 20% by weight methyl methacrylate.

5. The method of claim 1, wherein said monomer comprises aralkyl (meth)acrylates as comonomers.

6. The method of claim 1, wherein said monomer comprises 0.5–10% by weight acrylic acid esters.

7. The method of claim 1, wherein said monomer comprises 0.1–20% by weight cross-linking monomers.

8. The method of claim 5, wherein benzyl methacrylate is used as said aralkyl (meth)acrylate and allyl (meth)acrylate is used as a cross-linking monomer.

9. A method for making poly(meth)acrylate particles comprising the steps of:

polymerizing in a liquid medium comprising 55–100% by weight of mineral oil:

20–50 parts by weight of a monomer of the formula (I):

$$CH_2=\underset{\underset{R}{|}}{C}-\underset{\underset{O}{\|}}{C}OR_1 \quad (I)$$

wherein R is hydrogen or a methyl group and $R_1$ is a $C_{1-8}$ alkyl or a $C_{6-14}$ aryl group;

0.1–5 parts by weight relative to said monomer of a polymer emulsifier; and 0.05–5 parts by weight relative to said monomer of a radical initiator;

wherein said particles have a mean diameter of 1–15 μm.

10. The method of claim 9, wherein said aryl group is selected from the group consisting of phenyl, naphthyl, aralkyl, benzyl and phenethyl.

11. The method of claim 10, wherein said aryl group has a $C_{1-8}$ alkyl group attached thereto.

12. The method of claim 10, wherein said aryl group is a benzyl or a phenethyl group.

13. The method of claim 9, wherein said monomer comprises at least 20% by weight of methyl methacrylate.

14. The method of claim 9, wherein said monomer comprises at least 30% by weight of methyl methacrylate.

15. The method of claim 9, wherein said monomer comprises at least 70% by weight of methyl methacrylate.

16. The method of claim 9, wherein said monomer comprises 100% by weight of methyl methacrylate.

17. The method of claim 9, wherein said emulsifier is a styrene/olefin block copolymer, said olefin being selected from the group consisting of ethylene copropylene, ethylene cobutylene, polyisoprene and butadiene.

18. The method of claim 9, wherein said initiator is an azo initiator or a peroxy initiator.

19. The method of claim 18, wherein said peroxy initiator is a perester or a percarbonate.

20. The method of claim 9, wherein said liquid medium further comprises a solvent component selected from the group consisting of toluene and butylacetate.

21. The method of claim 9, wherein the percent of said monomer which is converted to polymer proceeds from zero to >80% in a time of 15–60 minutes.

22. The method of claim 9, wherein the percent of said monomer which is converted to polymer proceeds from 1 to >90% in a time of 15–50 minutes.

23. The method of claim 9, wherein said particles have an index of refraction, $n_D$, of 1.48–1.58.

24. The method of claim 9, wherein 80% by weight of said particles have a size range of within ±20% of said mean diameter.

25. The method of claim 9, wherein 90% by weight of said particles have a size range of within ±20% of said mean diameter.

\* \* \* \* \*